UNITED STATES PATENT OFFICE.

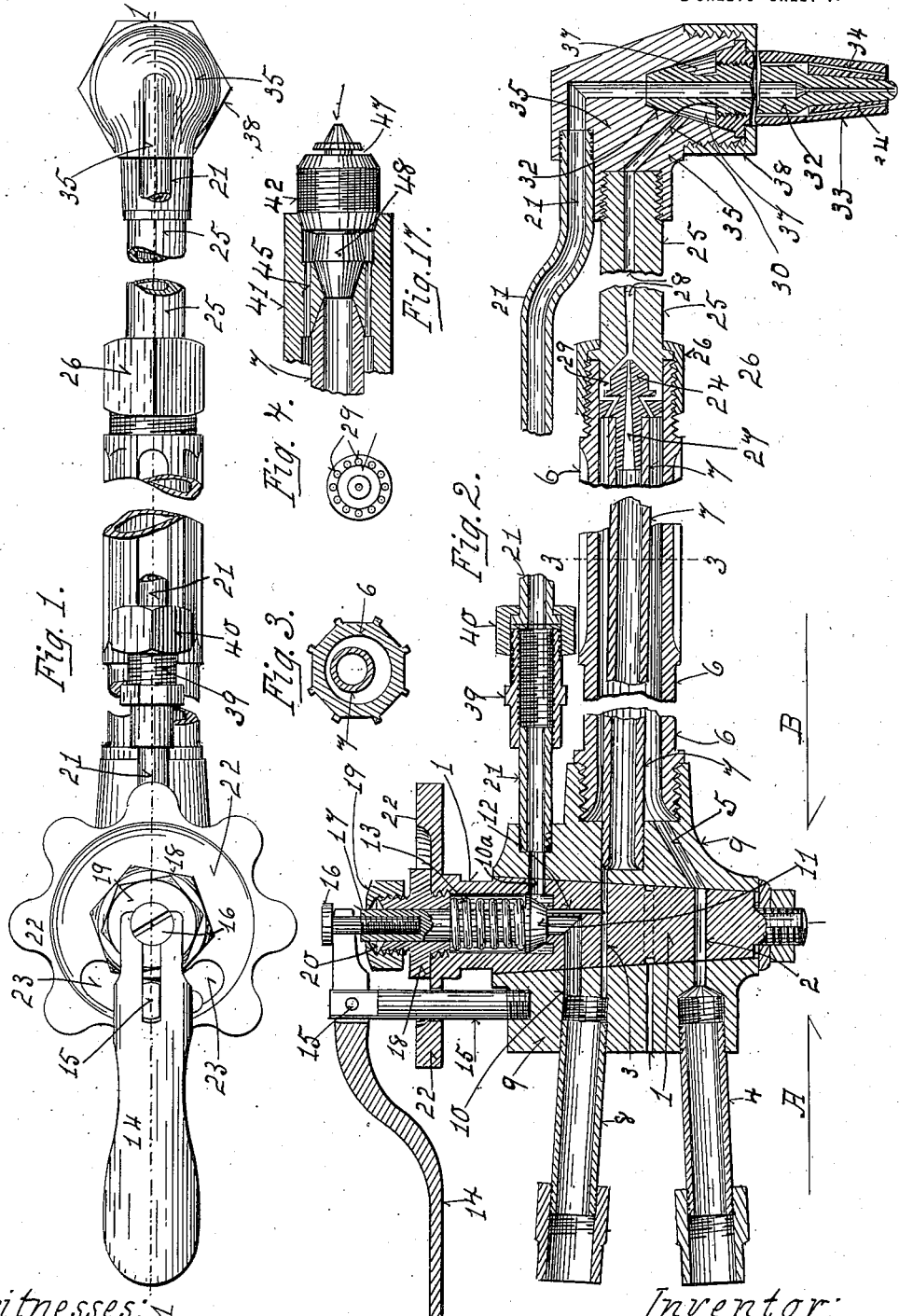

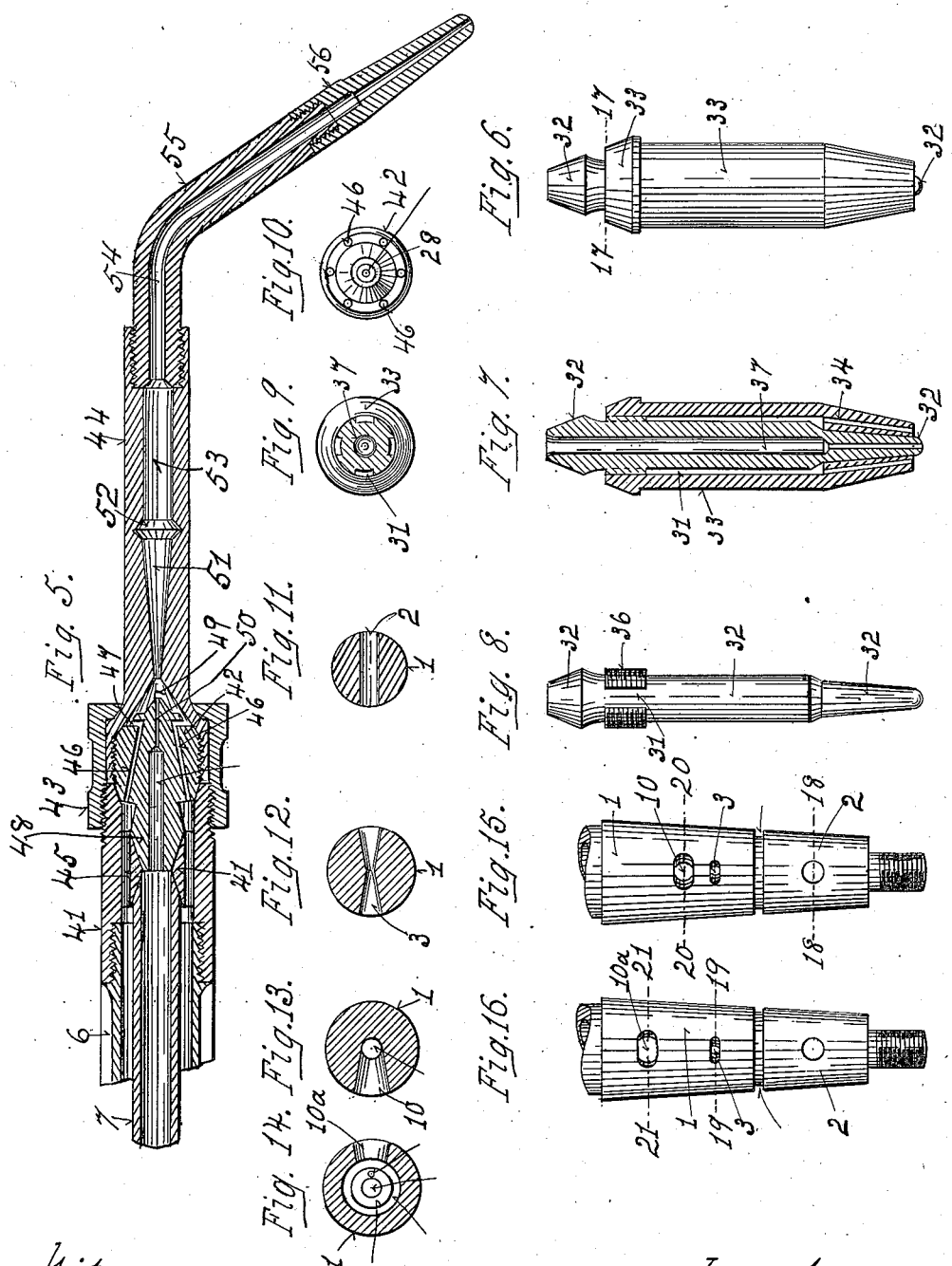

LUDWIG STETTNER, OF OAKLAND, CALIFORNIA, ASSIGNOR TO GREAT WESTERN CUTTING AND WELDING COMPANY INC., OF SAN FRANCISCO, CALIFORNIA.

COMBINED OXYGEN AND ACETYLENE CUTTING AND WELDING TORCH.

1,201,378.            Specification of Letters Patent.     Patented Oct. 17, 1916.

Application filed January 11, 1915. Serial No. 1,689.

*To all whom it may concern:*

Be it known that I, LUDWIG STETTNER, a subject of the Kingdom of Wurttemberg, in the Empire of Germany, resident in the city of Oakland, in the county of Alameda and State of California, have invented certain new and useful Improvements in combined Oxygen and Acetylene Cutting and Welding Torches, the following, taken in connection with the accompanying drawings, being a specification of the same.

The object of my invention is to provide an instrument light in weight, more perfect in control, better admixture of the combustible gases, and easily handled and controlled while being operated, facility in the governing of the proportion of oxygen to that of acetylene, and freedom from backfire.

A further and important improvement of my invention is the ability in the one valvular regulating part, of adapting the device, by means of a variety of extensions, nozzles and burner tips, to light or heavy cutting or welding.

Various details in the construction of the valvular and mixing arrangements will be disclosed, whereby the primary plug valve can be caused to perform the office of several valves and be readily adjusted to the different possible pressures of the different gases and, at the same time, be easily hand controlled as to the delivery of such a determined flow of the respective gases that the proportions of oxygen to the acetylene gas are best adapted for "cutting" or for welding metals, the gas mixture for "cutting", requiring a larger proportion of oxygen to acetylene gas, the gas mixture for welding requiring a larger proportion of acetylene gas to that of oxygen, and the final act of combination occur at the point of impact on the metal to be cut or welded, and the highest possible temperature for such a predetermined mixture, and, consequently, the most economical for the work accomplished.

In the several figures of drawings, forming part of this specification, similar characters of reference indicate like parts throughout the same.

Figure 1 is a top view, parts being shown as broken out between parts of continued or like construction. Fig. 2 is a vertical longitudinal elevation, taken on the line 1 of Fig. 1, with the cutting attachment connected. Fig. 3 is a vertical transverse section on the plane of the line 3, Fig. 2. Fig. 4 is a detail end-view of the mixing nozzle in the cutting attachment, looking in the direction of the arrow A, Fig. 2. Fig. 5 is a vertical longitudinal section of the welding attachment. Fig. 6 is an elevation of a cutting nozzle. Fig. 7 is a vertical section of Fig. 6. Fig. 8 is an elevation of the central oxygen conductor within the cutting nozzle, Figs. 2, 6, 7 and 10. Fig. 9 is a transverse section on line 17 of Fig. 6. Fig. 10 is a detail end view of the mixing nozzle in the welding attachment, Fig. 5. Fig. 11 is a transverse section of the plug valve, taken on the plane of the line 18, of Fig. 15. Fig. 12 is a transverse section of the plug valve, taken on the plane of the line 19, of Fig. 16. Fig. 13 is a transverse section of the plug valve taken on the plane of the line 20 of Fig. 15. Fig. 14 is a transverse section of the plug valve taken on the line 21, of Fig. 16. Fig. 15 is a detail elevation of the plug valve, looking in the direction of the arrow A, of Fig. 2. Fig. 16 is a detail elevation of the plug valve, looking in the direction of the arrow B, of Fig. 2. Fig. 17 is a detail elevation of the mixing nozzle in the welding attachment, Fig. 5, parts of which are shown in section.

The plug valve 1 is transversely perforated with two holes 2 and 3, the former when in registering alinement with the acetylene gas-pipe 4 also communicates with the inclined hole 5 connecting the hole 2 in the plug valve 1 with a similar passage-way to the pipe 4. The higher end of the hole 5 enters the interior of the pipe 6 within which is longitudinally arranged another smaller pipe 7 which is fed with a regulated amount of oxygen through a small passage 3 which, when in approximate alinement, conducts oxygen from the pipe 8 deriving its supply from a suitable source through connecting passages in the body of the plug valve 1 and in the housing 9.

The passage 10, entering the plug valve 1 transversely to a short, centrally vertical hole is normally closed by a valve 11, which also stops the upper end of a small passage 12 which supplements the oxygen flow to the passage 3, delivering a larger oxygen flow to the concentric pipe 7 when the disk valve 11 is raised from its seat. This valve 11 is forced upon its seat by a spring 13 whose pressure is sufficient to keep it closed against the highest oxygen pressure liable to be exerted on the nether side of the valve 11. The latter is opened when desired by depressing the free end of the hand lever 14 pivoted to the upper end of the post 15 securely seated in the housing 9. The short end of the lever 14 is bifurcated and hooks under the head of the screw 16 which is threaded and screwed into the upstanding stem 17 of the valve 11, so that, by depressing the free end of the lever 14, the valve 11 will be lifted, compressing the spring 13 up against the tubular double ended and threaded bolt 18, vertically through which the stem 17 of the valve 11 extends. The bottom end of the double ended bolt 18 is the abutment for the spring 13, forcing it down on the valve 11; the top end of the double ended bolt 18 is concaved and capped by an opposing concave cup-nut 19, thus leaving a lenticular concavity 20 that is filled with suitable packing material for preventing the escape of gas from around the stem 17 of the valve 11 when the latter is lifted in use, at which time oxygen vapor will, if connected with its source, be flowing from pipe 8, through the passage 10 and into the spring 13 cavity, thence through the passage 10ª into the tube 21.

The primary plug 1 is topped by the hand-wheel 22 whose web is perforated by an arc opening 23, up through which extends the post 15 serving as fulcrum for the lever 14. The post 15 also serves as a stop from accidental excessive rotation of the primary plug valve 1.

Referring now to Fig. 15 and its transverse section, Fig. 11, it will be observed that the passage 2 is of the same diameter all the way through the plug valve, thus permitting of cutting off the acetylene gas flow from the tube 4 into the passage 5 and tube 6 entirely, but not so cutting off the oxygen gas flow from the tube 8 to the tube 21, because the passages 3 and 10 in the plug valve 1 are horizontally flaring as shown in section in Figs. 12, 13, 14. Such a construction and arrangement permits the oxygen to flow by actuating the hand lever 14 by lifting the valve 11 from its seat on depressing the free end of the hand lever 14, without effecting the acetylene gas flow, but this, as well as the oxygen flow, may be entirely stopped by a further rotation of the plug valve 1, while a less rotation of it can adjust it to control the proportion of acetylene gas to that of oxygen. This is important because the pressure of one of the gases may be higher than that of the other, and the acetylene gas is easily produced in a simple, portable generator and a practically even pressure maintained.

The controllability of the gases by the means described, having been set forth, I will now proceed to describe the apparatus and necessity for the intimate mixture of the acetylene gas with the oxygen.

It would seem that hydro-carbon gas bears a similar relation to most other gases that hydro-carbon liquids, such as oils, bear to most other liquids in respect to viscidity, as witness the hydro-carbon marsh gas—"*ignis fatuus.*" In view of this viscous property, the mere introduction of the hydro-carbon to the oxygen does not immediately result in a thorough and intimate mixture, there being, as it were, globules of hydro-carbon disseminated through the oxygen. At the instant of combination of the mixture, the resulting vibration and heat from the separate individual explosions causes a roaring noise and indicates a loss of heat energy in the form of the desired heat.

Because of the more complete intermixture of the hydro-carbon gas as acetylene with a small amount of oxygen, as above stated, in my cutting and welding torch, by comparison with other devices for the purpose, I am able to produce a higher temperature with a given amount of acetylene gas and oxygen and less noise in the act of combustion.

The proportion of the oxy-acetylene and oxygen must be determined by the size of the metallic object to be cut; a more free delivery of the gases is required to produce a larger flame when a larger metallic object is to be cut. I, therefore have provided a number of cutting nozzles 33 having larger or smaller discharge orifices 34, as required. The admission of the oxy-acetylene gases should be controlled with respect to its rate of propulsive force, the smaller orifices 34 causing the oxy-acetylene mixture to issue with more force but less quantity than will the larger orifices 34. Communication of the orifices 34 with the space 31 is made by boring the orifices 34 from the tips of the cutting nozzle 33 at a diverging angle to each other thus projecting the gases at an angle converging to and with the median stream of oxygen issuing from the orifice, in the tip of the central conveyer tube 32. This orifice may be larger or smaller in area than the combined area of the orifices 34, the kind and size of the metallic object to be cut, determining the relative diameters of these orifices, too great a disparity in their diameters or too much oxygen or too much acetylene gas resulting in less projective force of one or the other of the gases, an excess of oxygen oxidizing the more volatile metals of an alloy to the detriment of rapid work and, sometimes, offensive unhealthy fumes.

Communication of the orifices 34, with the space 31 is had by the conical top of the central conveyer 32 being cut away at a point a short distance below its frustum, leaving an annular space 37 between the beveled top of the shell of the cutting nozzle 33 and the beveled top part of the central conveyer 32 when in position in the head 35, into which the pipes 21 and 25 are screwed as shown in Fig. 2. The annular space 37 communicates with the passage 28 in the tube 25, and this to the space 29 around the mixing nozzle 24, and this, by a series of small passages, Fig. 4, with the interior of the tube 6. The cutting nozzle 33 is retained in gas tight position in the conical cavity in the head 35, by a union cap-nut 38, Fig. 2.

When changing the device from a cutting to a welding torch, the pipe 21 is removed by unscrewing the union coupling 39, 40, then plugging the threaded hole in the housing 9 from which the pipe 21 has been taken, then removing the pipe 25 from the pipe 6 by unscrewing the union cap-nut 26 and substituting therefor the short, internally threaded end of the pipe 41, Fig. 5, the other end of which is exteriorly threaded to fit the union cap-nut 43. A mixing nozzle 42, shown in elevation in Fig. 17 with the ends of pipes 7, 41, in section, illustrating the manner of making gas tight joints that prevent interchange of the different gases between the interior of the pipes 7, 41, the elongation 48 of the mixing nozzle 42 being exteriorly coned at its end to enter one of the reversely concaved ends of a centrally extending ring integral with the pipe 41, through which a number of longitudinal holes 45 are circularly arranged, through which the acetylene may pass to the mixing nozzle 42, through which the acetylene gas passes by converging holes 46, Fig. 5, that discharge at the bottom of a circular slot 47 which acts as a baffle and from which the acetylene gas radially flows into chamber 49 at the end of the mixing nozzle 42, from the point of which, through a central passage 50, oxygen is caused to flow by means hereinbefore explained.

To still further intimately mix the oxygen and acetylene, they are made to pass through chambers of varying diameters the first chamber 51 gradually diverging by increasing diameter to a circular niche 52 to a cylindrical chamber 53, thence into the central passage way 54 in the bent pipe 55 to the burner tip 56, which is preferably made of metal capable of withstanding a high degree of temperature.

The very small passage 50 and the disparity in diameters of the chambers 51, 52 and 53 are means for the prevention of detrimental back firing, because any explosion of the mixed gases in these chambers results in synchronal expansion in volume and pressure of the resulting carbon dioxid gas, some of which forced back, baffles the inflowing uncombined mixture toward the point of enrichment by the oxygen, shuts off the inflow of the latter and extinguishes the flames.

Reverting now to Figs. 2, 15, 16 it will be observed that the plug valve 1 is encircled by a groove, the purpose of which is to permit leakage from above or below to escape before mixing.

Claims:

1. In apparatus of the character described; a housing provided with pairs of ports and having a main opening into which the ports lead; a rotatable plug valve mounted within the main opening and having transverse ports adapted for movement into and out of registration with the ports in said pairs of ports, said plug valve having an opening formed therein; a separate valve mounted within the opening of the plug valve and arranged to control the passage of gas through one port formed in the plug valve; a spring to normally retain the separate valve seated; a hand wheel connected with the outer end of the plug valve to turn it and provided with a curved slot; a stud secured to the housing and extending through the curved slot; a pivoted lever carried by the stud and connected with the separate valve to operate it; a cutting nozzle; and conduits connecting the cutting nozzle and certain ports in the housing.

2. In apparatus of the character described; a housing provided with pairs of ports and having a main opening into which the ports lead; a rotatable plug valve mounted within the main opening and having transverse ports adapted for movement into and out of registration with the ports in said pairs of ports, said plug valve having an opening formed therein; a separate reciprocatory valve arranged within the opening of the plug valve and disposed to control the passage of gas through one port formed in the plug valve; a spring to normally retain the reciprocatory valve seated; a stem connected with the reciprocatory valve and having a lateral extension; a hand wheel connected with the outer end of the plug valve to turn it; a pivoted lever having a loose pivotal connection with the stem beneath its lateral extension to move the reciprocatory valve independently of the turning movement of the plug valve; a cutting nozzle; and conduits connecting the cutting nozzle and certain ports in the housing.

3. In apparatus of the character described; a housing provided with pairs of ports and having a main opening into which the ports lead; a rotatable plug valve mounted within the main opening and having transverse ports adapted for movement into and out of registration with the ports in said pairs of ports, said plug valve having an opening formed therein; a separate reciprocatory valve arranged within the opening of the plug valve and disposed to control the passage of gas through one port formed in the plug valve; a spring to normally retain the reciprocatory valve seated; manually operated means to unseat the reciprocatory valve; means to turn the plug valve; an outer tube connected with the housing and having its interior communicating with one port of the housing; a second tube extending longitudinally within the outer tube and having its interior communicating with another port of the housing; a conduit connected with the outer tube and forming therewith a mixing chamber; a nozzle arranged within the mixing chamber and connected with the inner tube; a cutting nozzle connected with the conduit; and an oxygen supply tube connected with the cutting nozzle and having communication with another port of the housing.

LUDWIG STETTNER.

Witnesses:
F. A. WISWELL,
R. H. ADAMS.